Dec. 22, 1942.   W. J. JACOBSSON   2,306,060
PRESSURE REGULATING AND REDUCING APPARATUS
Filed Oct. 31, 1940.   3 Sheets-Sheet 1

INVENTOR
WILGOT J. JACOBSSON
BY
*E L Freenewald*
ATTORNEY

Dec. 22, 1942. W. J. JACOBSSON 2,306,060
PRESSURE REGULATING AND REDUCING APPARATUS
Filed Oct. 31, 1940 3 Sheets-Sheet 2
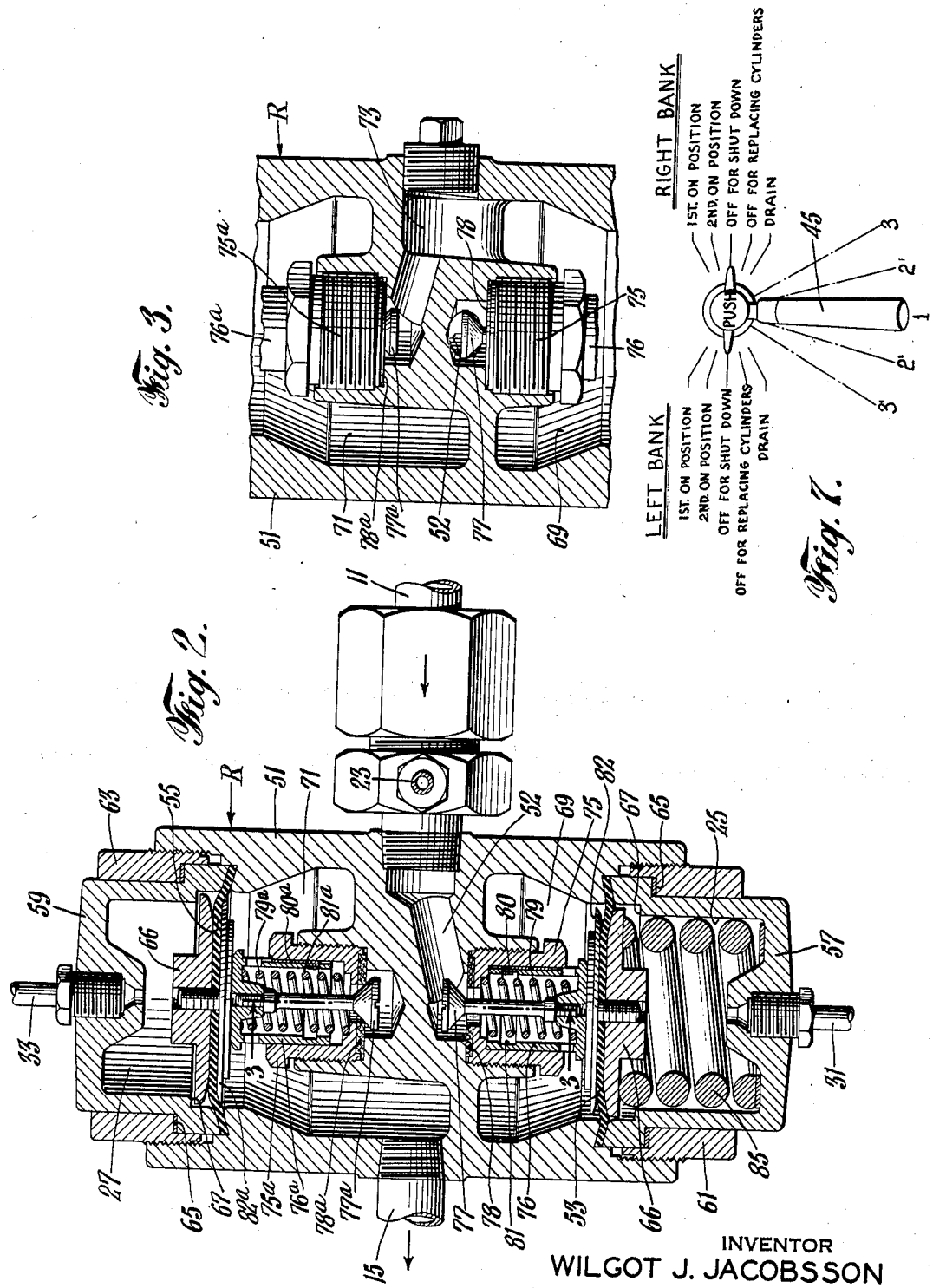
INVENTOR
WILGOT J. JACOBSSON
BY
ATTORNEY

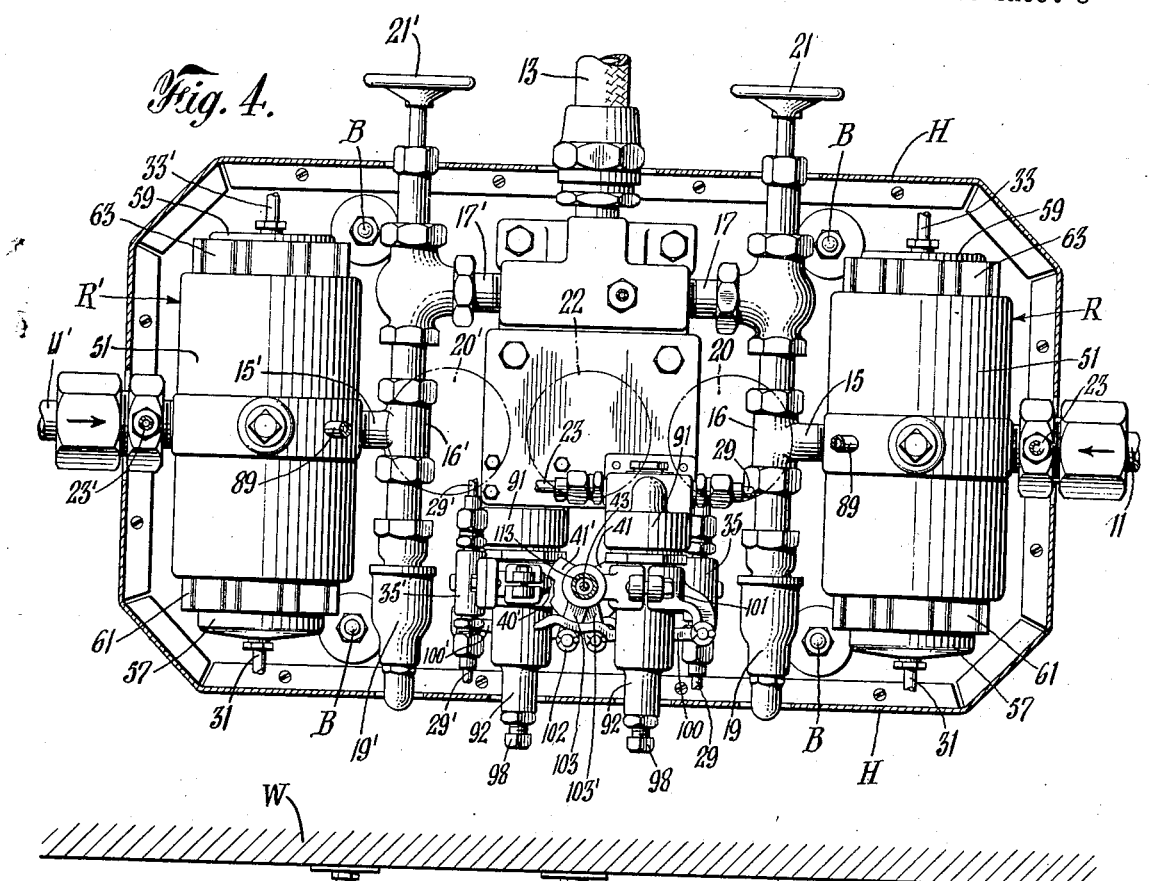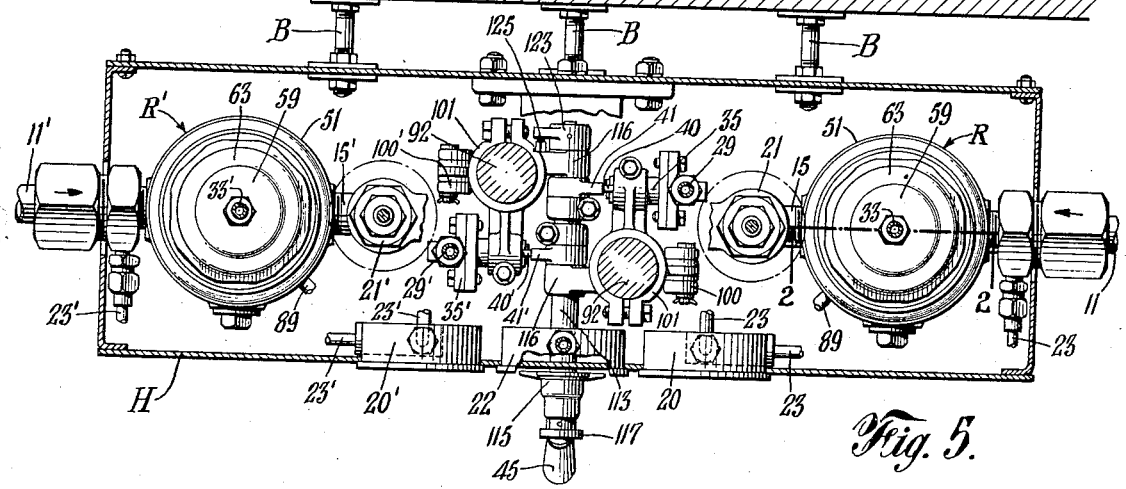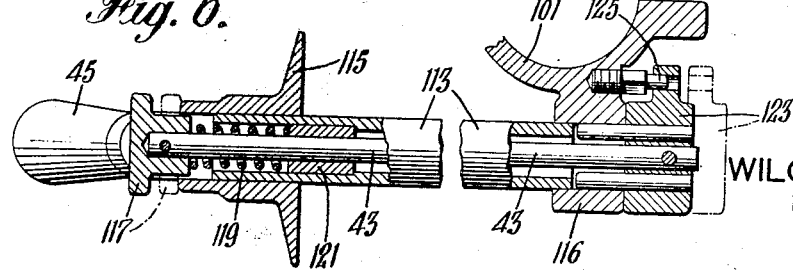

Patented Dec. 22, 1942

2,306,060

UNITED STATES PATENT OFFICE 2,306,060

PRESSURE REGULATING AND REDUCING APPARATUS

Wilgot Julius Jacobsson, Plainfield, N. J., assignor, by mesne assignments, to Union Carbide and Carbon Corporation, a corporation of New York Application October 31, 1940, Serial No. 363,653

16 Claims. (Cl. 221—73.5)

This invention relates to multi-stage fluid pressure regulators, and to a process and apparatus for concurrently controlling the flow of a fluid through two or more multi-stage fluid pressure regulators of high capacity operating in separate lines respectively feeding the fluid to a common manifold, for providing continuous uninterrupted delivery to the manifold of fluid at a constant pressure from two independent, exhaustible sources of supply.

Multi-stage pressure regulators are now in common use for the pressure regulation of a wide variety of fluids. These regulators have two or more separate regulating stages, each essentially provided with a valve, a valve seat, a diaphragm, an adjustable spring for exerting a suitable pressure upon the valve to open or close the same against inlet pressure, spring adjusting mechanism, and a spring cap. These multi-stage regulators provide much more accurate pressure regulation than do single-stage regulators when controlling the flow of a gas from a source of supply under constantly changing pressure, as when a welding gas is being withdrawn from one or more cylinders thereof.

In industrial practice today it is common to supply welding gases such as oxygen in large volumes of 20,000 or more cubic feet per hour from large batteries of cylinders of high pressure gases connected in banks. The adequate pressure regulation of the large volumes of gases required in shops conducting extensive gas cutting, desurfacing and welding operations heretofore has been rendered difficult because of the fact that extremely large, heavy regulator springs have been required in each stage of the multi-stage pressure regulators to adapt them for this high capacity service. Such regulators therefore have been very heavy and bulky, and extremely difficult to adjust. When the pressure of one battery of cylinders was reduced to near manifold or line pressure, many difficulties arose in changing from one gas source to a fresh source without serious interruption of the delivery line pressure due to regulation adjustment difficulties.

The present invention effectively eliminates these objectionable features of prior regulating apparatus, and provides a high-capacity multistage pressure regulator which is relatively small, compact, is comparatively inexpensive, and facilitates the rapid change from one source of gas to another without interrupting the gas flow to the discharge manifold or reducing the delivery line pressure.

Among the more important objects of the invention are: To provide a novel compact multistage pressure regulator for high-capacity service; to provide in novel manner for substituting one high pressure source of fluid for another failing source thereof without interrupting the delivery or line pressure; and to provide in novel manner for the continuous accurate control of a high-capacity multi-stage pressure regulator. These and other objects will be apparent as the following description proceeds.

According to the invention, the respective pressure stages of a multi-stage main regulator are simultaneously controlled by a single pilot regulator, which may be a low-capacity regulator. In one form of the invention, two or more of these multi-stage main regulators controlling gas flow from respective batteries of cylinders of high pressure gases, or from other sources of such gases, to a common discharge manifold of high capacity, are separately controlled by means of respective pilot regulators, each of which, in turn, is controlled by fluid pressure from the source feeding the corresponding multi-stage regulator. At the same time, an independent intercontrol of the two main regulators permits drainage of the low pressure source of fluid supply while maintaining the required delivery pressure in the common manifold.

Referring to the accompanying drawings, which illustrate certain modifications of the invention, Fig. 1 is a diagrammatic view of an apparatus assembly of the invention for maintaining a uniform delivery pressure in gas flowing to a high-capacity manifold from two independent sources of diminishing supply;

Fig. 2 is a longitudinal section through the multi-stage regulator taken along the line 2—2 of Fig. 5;

Fig. 3 is a fragmentary section taken along the lines 3—3 of Fig. 2, looking in the direction of the arrows, parts being omitted;

Fig. 4 is a front elevation of one form of apparatus assembly, parts being broken away, and other parts omitted;

Fig. 5 is a plan view of the apparatus of Fig. 4, parts being shown in section, other parts being broken away, and still other parts omitted;

Fig. 6 is a view, partly in section, of the operating lever and associated parts; and Fig. 7 is a front view of the control handle.

Figure 1:
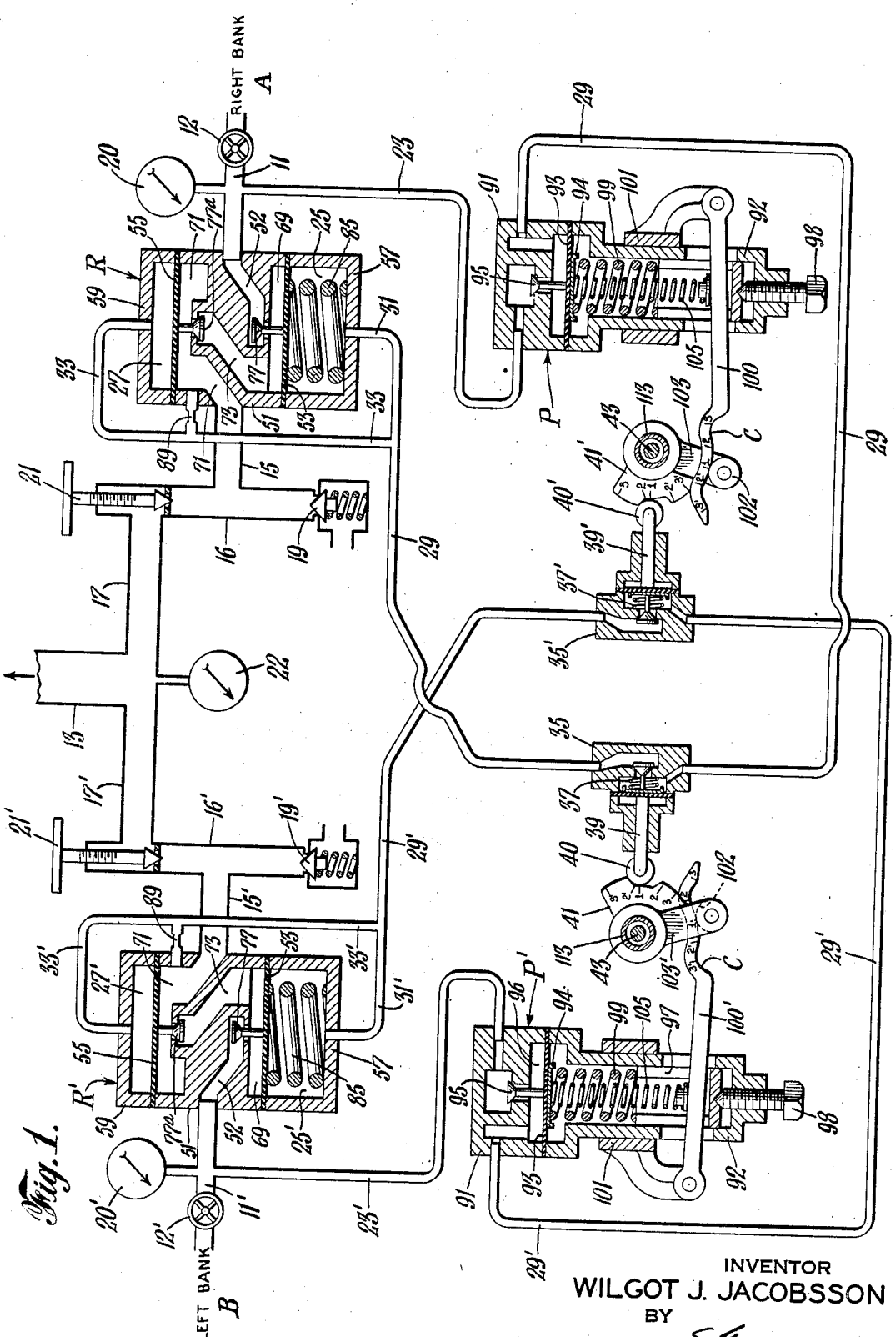

In the following description, in view of the identical construction of the respective two-stage main regulators; and the respective pilot regulators; only one of each will be specifically described.

Referring to Fig. 1, the two-stage regulators R, R' have their respective inlets connected, through inlet lines 11, 11', having cut-off valves 12, 12', with corresponding sources of supply of a high pressure fluid such as oxygen or a fuel gas. Each source of supply may consist of a plurality of cylinders of the gas, connected in series in well-known manner. These main regulators have their respective outlets connected with a high-capacity manifold 13 through the branch lines 15, 15', 16, 16' and 17, 17'. Pressure relief valves 19, 19', and flow-regulating valves 21, 21' are in the respective lines 16, 16'. High pressure gauges 20, 20' are in inlet lines 11, 11'; and a delivery gauge 22 is in manifold 13.

Two pilot regulators P, P' have their respective fluid inlets connected with the high pressure inlet lines 11, 11' by conduits 23, 23'; and have their outlets in communication with the respective pressure-tight diaphragm chambers 25, 25' and 27, 27' of the regulators R, R', by means of conduits 29, 29', and the branch conduits 31, 31' and 33, 33'. Operatively interposed in the respective conduits 29, 29' are corresponding cut-off valves 35, 35', which open against inlet pressure and are normally maintained in closed position by springs 37, 37'. The respective valves 35, 35' have stems operatively associated with operating pins 39, 39', respectively carrying rollers 40, 40' which contact corresponding cam surfaces of members 41, 41'. The latter are secured upon an axially rotatable control cam shaft 43 having an operating handle 45. (For convenience, in Fig. 1 the cam shaft 43 is shown as two separate shafts.)

As more clearly shown in Figs. 2 and 3, each two-stage regulator is formed of a unitary housing 51, preferably pressure-forged or die-cast, having an inlet passage 52; and having respective intermediate pressure and low pressure cavities 69, 71 in its respective ends; and having the end margins bored and counterbored to provide annular clamping surfaces for diaphragms 53, 55, secured in position by the respective fluid-tight caps 57, 59 and annular clamp members 61, 63. The latter have threads engaging internal threads on said bores; and have shoulders 65 cooperating with shoulders formed on caps 57, 59. Diaphragm plates 66 are secured to the respective diaphragms 53, 55, and have outer margins cooperating with movement-limiting shoulders 67 formed on the caps 57, 59.

The cavities in the housing and the diaphragms 53, 55 define, respectively, an intermediate pressure chamber 69 and a low pressure chamber 71 in communication through a passage 73. Threadedly secured in central bores in the respective intermediate and low pressure cavities, and removable as a unit therefrom, are corresponding unitary valve assemblies. Each assembly comprises an outer cup 75, 75; an apertured hollow spring housing and valve supporting member 76, 76a, longitudinally slideable in said cup; a valve 77, 77a, having its stem secured to said member 76, 76a; a valve seat 78, 78a, of suitable material interposed between the head of valve 77, 77a, a shoulder on housing 51, and the adjacent portion of the cup; a valve spring 79, 79a, interposed between an end wall of member 76, 76a and a recess in the opposite end of cup 75, 75a; spaced valve vibration dampening springs 80, 80a, disposed between the contacting surfaces of member 76, 76a, and cup 75, 75a, and having an end secured in a groove 81, 81a in the latter; and a diaphragm plate 82, 82a, interposed between the closed end of member 76, 76a and a corresponding diaphragm.

The cap 57 defines with the diaphragm 53 and associated parts a fluid-tight pressure chamber 25 having therein a spring 85 interposed between diaphragm plate 66 and a washer in the end of the cap 57, and adapted to open the valve against the opposition of spring 79. Chamber 25 communicates with the outlet from valve 35 through lines 29, 31.

The cap 59 defines, with the diaphragm 55 and associated parts, a fluid-tight pressure chamber 27 which is in communication with the outlet from valve 35 through lines 29, 33. A bleeder conduit or orifice member 89 (see Fig. 1) connects the low pressure chamber 71 with conduit 33.

As shown in Fig. 1, each pilot regulator P consists of a body portion 91; a spring housing 92; a diaphragm 93 secured between said body and housing; a diaphragm plate 94; a valve 95 opening against inlet pressure, and having a stem interconnected with said diaphragm plate for movement therewith; a passage within said body having a valve seating surface cooperating with said valve; an outlet chamber 96 connected with a corresponding cut-off valve 35, 35'; a pressure transmitting member 97 slideable within housing 92; an adjusting screw 98 adapted to slide member 97 toward the diaphragm; and a spring 99 operatively interposed between member 97 and plate 94. For manually adjusting valve 95, a lever 100 extends through slots in the housing 92 and member 97, and has an end pivotally connected to a lug on a member 101 secured to housing 92. The other end of lever 100 has a cam surface C adapted to cooperate with a roller 102 carried by an arm 103 secured to the control shaft 43. A spring 105 is interposed between a stud on lever 100, and plate 94.

The cam shaft 43 concurrently controls operation of both pilot regulators P, P', and of the cut-off valves 35, 35' associated therewith. For this purpose, the arms 103, 103', secured to the shaft 43 at spaced points, cooperate with the cam surfaces of the levers 100, 100' of the respective pilot regulators; and spaced cam members 41, 41' on the shaft 43 cooperate with the contact rollers on stems 39, 39' of the cut-off valves 35, 35'.

Figs. 4 to 7 illustrate one form of apparatus assembly adapted to be housed within a metal housing H and supported upon a wall W as by bolts or the like B. Here the cam shaft 43 is mounted for axial movement within a casing 113 which is supported at its respective ends upon a flanged sleeve 115, secured to the front wall of housing H, and carrying handle 45; and upon a flange extension 116 of a member 101. A locking button 117 is secured to the forward end of shaft 43; and a spring 119 is interposed between the button and a sleeve 121 secured within casing 113. A collar 123, secured to the rear end of shaft 43 has a plurality of spaced apertures, into any one of which a pin 125 carried by flange 116 may extend, excepting when button 117 is depressed manually.

In the operation of each two-stage regulator, high pressure gas, usually at pressures around 2000 pounds per square inch, enters the regulator through inlet line 11 and passage 52. Concurrently the pilot regulator P transmits its outlet pressure into the pressure chambers 25, 27, through conduits 29, 31 and 33. Spring 85 exerts a constant force against diaphragm 53, which opens valve 77 when no gas pressure is exerted in intermediate pressure chamber 69. Spring 79 acts to close valve 77 when the fluid pressure in chamber 25 in conjunction with the pressure of spring 85 is counterbalanced by pressure in chamber 69. When valve 77 is open, high pressure gas flows into chamber 69 until the pressure in the latter rises slightly above that exerted by the spring 85 and the fluid pressure in chamber 25, whereupon spring 79 acts to close valve 77.

The gas in chamber 69 flows through passage 73 to and past valve 77a to chamber 71 and outlet line 15, since the gas pressure in chamber 27 (equal to that in chamber 25), is greater than the pressure exerted by spring 79a upon the valve. The spring 85 in chamber 25 causes a selected pressure differential between chambers 25 and 27. When the pressure in chamber 71 reaches a selected maximum, the valve 77a closes. The degree of pressure in chamber 71 at which this valve closes depends upon the fluid pressure in chamber 27, which in turn is regulated by the pilot regulator cooperating therewith.

In the use of the apparatus for the uniform continuous pressure regulation of a gas flowing to a high-capacity service manifold from one of two independent sources of diminishing supply,—assume line 11 to be connected with a high pressure source of supply A, but with valve 21 closed; and valve 12' connected with a supply source B which has become exhausted to a pressure slightly above that desired in manifold 13,—and the handle 45 in position to render the cam surfaces marked 2' operative. Both pilot valves are open, with regulator P' delivering gas under pressure determined by the adjustment of springs 99. Valve 35 is closed; and valve 35' is open.

In order to insure against pressure variations in the manifold 13 during the change-over from one source of supply to the other, handle 45 is moved so as to render cam surfaces 3 operative. Thereupon valve 35 is opened, and valve 35' remains open; and gas under pressure flows from regulator P to the regulator R. Regulator P' concurrently is readjusted by action of lever 100' on spring 105 to deliver gas to regulator R' under an increased pressure, thereby opening the valves of the latter wider and facilitating drainage of the low pressure source. The main line valve 21 now is opened, and the new high pressure source A connected with manifold 13 while the low pressure source B is draining. The handle 45 then is shifted to render cam surfaces 2 operative, whereby valve 35' is closed; valve 35 remains open; and release of cam lever 100' returns regulator P' to its normal operation under action of spring 99. Valves 12' and 21' then are closed, and the left bank of exhausted gas cylinders is replaced by fresh ones.

It will be evident that when the falling pressure of the right hand source of supply A approaches the desired delivery pressure, the same procedure may be employed, first adjusting handle 45 to render cam surfaces marked 3' operative; and subsequently moving it to make cam surfaces 2' operative.

When the handle 45 is moved to render cam surfaces 3' operative, cam lever 100 of regulator P is lifted, compressing spring 105, thereby increasing the delivery pressure of gas leaving that regulator. Cam lever 100' of regulator P' has not been thus compressed. Valve 35 remains open, and valve 35' is opened. Valve 21' then is opened. The right hand source of supply will furnish gas to manifold 13 until the pressure in line 11 equals that in the manifold, whereupon handle 45 is moved to render cam surfaces 2' operative. Valves 12 and 21 then are closed— and the exhausted source of supply replaced. During such replacement an uninterrupted and constant supply of gas was delivered to the manifold at a constant pressure.

It will be evident that the differential spring 85 of each multi-stage regulator provides only a selected differential between the pressures in the respective chambers 25, 27; and that the setting of each pilot regulator P, P' determines the minimum pressures at which both stages of an associated two-stage regulator will remain open.

For shutting down the system, the handle is moved to bring the respective cam surfaces to the positions 1, whereby valves 35, 35' are closed. The valves 12, 12', 21 and 21' then are closed.

This invention has made possible a great reduction in the overall size of pressure regulators required for high-capacity multi-stage fluid pressure regulators; the elimination of the usual heavy last-stage springs heretofore required; and the effective use in the preceding pressure stage or stages of much smaller springs than previously used therein. The invention further provides for readily changing from one gas source to another under a higher pressure without any interruption in the high-capacity flow of gas to the delivery manifold, or any variation in its delivery pressure.

The invention is susceptible of modification within the scope of the appended claims.

I claim:

1. High-capacity multi-stage pressure regulating and reducing apparatus comprising a body having a gas inlet and a gas outlet; means in said body for partially reducing the pressure of gas supplied through the inlet under high pressure, said means including a valve, a diaphragm, resilient means for actuating said valve, and a pilot-controlled valve-actuating pressure chamber adapted to transmit fluid pressure to said diaphragm; and means for further reducing the pressure of the gas, the last-named means including a second valve, a second diaphragm, and a second pilot-controlled valve-actuating fluid pressure chamber adapted to transmit fluid pressure to said last-named diaphragm; pilot pressure-regulating means connecting each of said pressure chambers with a source of fluid under pressure; and means establishing restricted communication between said last-named pressure-regulating means and a gas outlet.

2. High-capacity multi-stage pressure regulating and reducing apparatus having flow capacities therethrough of upwardly of 15,000 to 20,000 cubic feet of gas per hour, comprising, in combination, a unitary body having a gas inlet and a gas outlet; means in said body for partially reducing the pressure of gas flowing through the inlet under high pressure, said means including a valve, a diaphragm, resilient means for actuating said valve, and a pilot-controlled valve-actuating pressure chamber adapted to transmit fluid pressure to said diaphragm; and means in said body for further reducing the pressure of the gas to a uniform selected minimum pressure, the last-named means including a second valve, a second diaphragm, and a second pilot-controlled valve-actuating fluid pressure chamber adapted to transmit fluid pressure to said last-named diaphragm; means connected with each of said pressure chambers for concurrently applying a selected differential fluid pressure to each of said diaphragms; and means establishing restricted communication between said differential pressure-applying means and a gas outlet.

3. High-capacity multi-stage pressure regulating and reducing apparatus having flow capacities therethrough of upwardly of 15,000 to 20,000 cubic feet of gas per hour, comprising, in combination, a body having a gas inlet and a gas outlet; means in said body for partially reducing the pressure of gas flowing through the inlet at the pressure of approximately 2000 pounds per square inch or more, said means including a valve, a diaphragm, resilient means for actuating said valve, and a pilot-controlled pressure chamber adapted to transmit fluid pressure to said diaphragm; and means in said body for further reducing the pressure of the gas to a uniform selected minimum pressure, the last-named means including a second valve, a second diaphragm, and a second pilot-controlled fluid pressure chamber adapted to transmit fluid pressure to said last-named diaphragm; and a low-capacity pressure regulator connected with each of said pressure chambers for concurrently actuating the respective diaphragms and valves associated therewith.

4. High-capacity multi-stage pressure regulating and reducing apparatus comprising a regulator body having a high pressure passage provided with an inlet; a valve and valve seat within said body; a cap and diaphragm associated with said body and defining with the latter an intermediate pressure chamber and a pilot-controlled pressure chamber respectively on opposite sides of said diaphragm; a spring disposed within said pilot-controlled pressure chamber and actuating said valve; a second valve and valve seat within said body; a second cap and a second diaphragm associated with said body and defining therewith a low pressure chamber and an unobstructed second pilot-controlled pressure chamber on opposite sides of said second diaphragm; an outlet from said low pressure chamber; pressure-regulating means for concurrently applying a selected fluid pressure to each of said pilot-controlled pressure chambers; and flow-restricting means establishing communication between the last-named means and said low pressure chamber.

5. High-capacity multi-stage pressure regulating and reducing apparatus comprising a regulator body having a high pressure passage provided with an inlet, a valve and valve seat within said body; a cap and diaphragm associated with said body and defining with the latter an intermediate pressure chamber and a pilot-controlled pressure chamber respectively on opposite sides of said diaphragm; a spring disposed within said pilot-controlled pressure chamber and acting in conjunction with fluid pressure in the latter to open said valve; a second valve and valve seat within said body; a second cap and diaphragm associated with said body and defining therewith a low pressure chamber and an unobstructed second pilot-controlled pressure chamber on opposite sides of said second diaphragm; a fluid pressure in said second pilot-controlled pressure chamber serving as the sole means for opening said second valve; an outlet from said low pressure chamber; and adjustable means for transmitting a selected fluid pressure to each of said pilot-controlled pressure chambers.

6. High-capacity multi-stage pressure regulating and reducing apparatus for reducing the pressure of high pressure gases, comprising, in combination, a regulator body having a high pressure passage provided with an inlet, an intermediate pressure chamber, and a low pressure chamber provided with an outlet; a diaphragm forming a wall of the intermediate pressure chamber; a valve for controlling the flow of gas from the high pressure passage to the intermediate pressure chamber, and operatively associated with said diaphragm; a second diaphragm forming a wall of the low pressure chamber; a second valve for controlling the flow of gas from the intermediate pressure chamber to the low pressure chamber, and operatively associated with said second diaphragm; a pilot-controlled pressure chamber; said first-named diaphragm forming a wall of the last-named chamber; resilient means in said pilot-controlled pressure chamber for actuating the first-named valve; a second pilot-controlled pressure chamber having a wall thereof formed by said second diaphragm; adjustable means for concurrently conducting a fluid under a selected pressure to the respective pilot-controlled pressure chambers; and means establishing restricted communication between the last-named means and the regulator outlet.

7. In a fluid pressure regulating system for the pressure regulation of fluids flowing in large volumes from a source of supply thereof under pressure, the combination of a pilot regulator receiving fluid under pressure from such source of supply; a main fluid discharge line; a high-capacity two-stage pressure regulator in said discharge line, said last-named regulator having an intermediate pressure chamber, and a pilot-controlled chamber operatively associated therewith, and having a low pressure chamber and a pilot-controlled chamber operatively associated therewith; a main pressure reducing valve, resilient means and an associated diaphragm operatively interconnected in said intermediate pressure chamber; a second main pressure reducing valve and an associated diaphragm operatively interconnected in the low pressure chamber; means connecting the discharge outlet of said pilot regulator with each of said pilot-controlled chambers for actuating the main valves associated with said intermediate pressure chamber and said low pressure chamber; and means establishing restricted fluid communication between said connecting means and the outlet of said low pressure chamber.

8. A gas distribution system comprising means connecting two independent exhaustible sources of gas respectively under different pressures with a common manifold maintained at a selected still lower pressure, each of said means having therein a corresponding two-stage regulator of high capacity; two fluid pressure-controlled adjustable means of low capacity for concurrently controlling the flow of gas through and from the respective two-stage regulators to said manifold; and means associated with the respective adjustable means for draining the gas source of lower pressure into said manifold while concurrently conducting to said manifold gas flowing from the gas source of higher pressure.

9. A gas distribution system comprising two two-stage regulators, each of said regulators having an intermediate pressure chamber and a low pressure chamber; valves for controlling respectively the flow of a main stream of gas from a corresponding one of two independent exhaustible sources of supply to a corresponding one of said intermediate pressure chambers, and from the latter to a corresponding low pressure chamber; two pilot regulators having their respective inlets connected with a corresponding one of said sources of gas supply, and having their respective outlets operatively associated with each of the valves of a corresponding two-stage regulator for actuating said valves; and means operatively associated with each of said pilot regulators for selectively increasing the pressure of the fluid discharged by either pilot regulator, and effective for opening each of the valves of the two-stage regulator associated therewith, while concurrently limiting the pressure of the fluid discharged by the other pilot regulator.

10. A compact high-capacity multi-stage pressure regulating and reducing apparatus comprising a body having a gas inlet and a gas outlet; means in said body for partially reducing the pressure of gas supplied through the inlet under high pressure, said means including a valve, a diaphragm, yielding means for actuating said valve, a fluid-tight valve-actuating pressure chamber having said diaphragm forming part of a wall thereof, and means for conducting a fluid under pressure to said pressure chamber; and means for further reducing the pressure of the gas, the last-named means including a second valve, a second diaphragm, a second fluid-tight valve-actuating pressure chamber having said second diaphragm forming a portion of a wall thereof, and means operatively associated with the first-named pressure chamber for conducting a fluid under pressure to the last-named pressure chamber and for concurrently applying a selected fluid pressure upon the diaphragms respectively associated with said pressure chambers.

11. A compact high-capacity multi-stage pressure regulating and reducing apparatus comprising a body having a gas inlet and a gas outlet; means in said body for partially reducing the pressure of gas supplied through the inlet under high pressure, said means including a valve, a diaphragm, a spring for opening said valve, and a pressure chamber having said diaphragm forming a wall thereof, and adapted to transmit fluid pressure to said diaphragm for opening said valve; and means for further reducing the pressure of the gas, the last-named means including a second valve, a second diaphragm, and a second fluid pressure chamber having said second diaphragm forming a wall thereof, and adapted to transmit fluid pressure to said second diaphragm for opening said second valve; and means for concurrently conducting a fluid under a selected uniform pressure to each of the respective pressure chambers.

12. High-capacity multi-stage pressure regulating and reducing apparatus comprising a body having a gas inlet and a gas outlet; means in said body for partially reducing the pressure of gas supplied through the inlet under high pressure, said means including a valve, a diaphragm, resilient means for actuating said valve, and a pilot-controlled pressure chamber adapted to transmit fluid pressure to said diaphragm; and means for further reducing the pressure of the gas, the last-named means including a second valve, a second diaphragm, and a second pilot-controlled fluid pressure chamber adapted to transmit fluid pressure to said last-named diaphragm; and a pilot regulator controlling the fluid pressure transmitted to each of the respective pressure chambers.

13. High-capacity multi-stage pressure regulating and reducing apparatus comprising a body having a gas inlet and a gas outlet; means in said body for partially reducing the pressure of gas supplied through the inlet under high pressure, said means including a valve, a diaphragm, resilient means for opening said valve, and a pilot-controlled pressure chamber adapted to transmit fluid pressure to said diaphragm for opening said valve; and means for further reducing the pressure of the gas, the last-named means including a second valve, a second diaphragm, and a second pilot-controlled fluid pressure chamber adapted to transmit fluid pressure to said last-named diaphragm for opening said second valve; and pressure-regulating means connecting each of said pressure chambers with a source of fluid under pressure.

14. In high-capacity pressure-regulating and reducing apparatus, the combination of a main high-capacity two-stage regulator, and a pilot regulator for supplying a controlling pressure to operate each stage of said two-stage regulator; the main regulator having a high pressure inlet passage, an intermediate pressure chamber and a low pressure chamber; main valves and valve seats controlling communication between said passage and the intermediate pressure chamber, and between the latter and the low pressure chamber, each of said main valves opening against inlet pressure; the pilot regulator having a valve and valve seat, said valve opening against inlet pressure; the intermediate pressure chamber of said main regulator and the pilot regulator respectively having resilient means constantly acting to open the corresponding valve therein; fluid-pressure actuated diaphragms operatively associated, respectively, with a corresponding one of the respective main and pilot valves, and adapted to open and close said valves; the diaphragm associated with said low pressure chamber being operated in response both to the pilot delivery pressure and to the main regulator delivery pressure.

15. A gas supply system comprising a plurality of means connecting two independent exhaustible sources of gas respectively under different pressures with a common manifold maintained at a selected still lower pressure, each of such connecting means comprising a high capacity two-stage regulator; each of such two-stage regulators being provided with an intermediate pressure chamber having operatively associated therewith a pilot-controlled chamber, a main pressure reducing valve, a diaphragm and resilient valve-actuating means; each of the two-stage regulators also having a low pressure chamber and, operatively associated with the latter, a pilot-controlled chamber, a second main pressure reducing valve and a second diaphragm; two pilot regulators, each having an inlet connected with a corresponding one of said sources of gas and having an outlet operatively associated with each of said main valves of a corresponding two-stage regulator; and means for selectively increasing the pressure of the fluid discharged from either pilot regulator and effective for opening each of the valves of the two-stage regulator associated therewith and for increasing the rate of fluid discharged from that two-stage regulator, and for concurrently limiting the pressure of the fluid discharged from the other pilot regulator and effective for limiting the flow of fluid discharged from the two-stage regulator associated therewith.

16. In a gas distribution system, the combination of a plurality of main high-capacity multi-stage pressure regulators, each having a fluid inlet, an intermediate pressure chamber, a low pressure chamber, and a fluid outlet; means concurrently controlling the flow of fluid from each of said inlets to a corresponding intermediate pressure chamber, and from the latter to a corresponding low pressure chamber and fluid outlet; a plurality of low-capacity pilot regulators each having an outlet passage transmitting fluid pressure effective for actuating both the means controlling fluid flow to a corresponding intermediate pressure chamber and the means controlling fluid flow from the latter to a corresponding low pressure chamber of a corresponding main regulator; quick acting means for selectively regulating the fluid pressure at each pilot regulator outlet, and means interassociated with each of said pilot regulators for selectively rendering either or both thereof inoperative.

WILGOT JULIUS JACOBSSON.